United States Patent
Karpati

(10) Patent No.: US 7,389,010 B2
(45) Date of Patent: Jun. 17, 2008

(54) METHOD AND APPARATUS FOR MONITORING THE SECURITY OF AN OPTICAL CABLE LINK DURING INSTALLATION

(75) Inventor: George Karpati, Quakertown, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 11/685,616

(22) Filed: Mar. 13, 2007

(65) Prior Publication Data
US 2008/0044179 A1 Feb. 21, 2008

Related U.S. Application Data

(63) Continuation of application No. 11/465,011, filed on Aug. 16, 2006, now Pat. No. 7,257,280.

(51) Int. Cl.
*G02B 6/00* (2006.01)
(52) U.S. Cl. .................................. 385/12; 385/100
(58) Field of Classification Search ............... 385/12, 385/100
See application file for complete search history.

(56) References Cited

U.S. PATENT DOCUMENTS

| 4,219,274 A | 8/1980 | Dabby et al. |
| 4,387,863 A | 6/1983 | Edmonston et al. |
| 4,445,649 A | 5/1984 | Yataki et al. |
| 4,609,181 A | 9/1986 | Fisher et al. |
| 4,657,203 A | 4/1987 | Crawford |
| 4,875,772 A | 10/1989 | Gentile |
| 5,440,528 A | 8/1995 | Walsh |
| 5,915,062 A | 6/1999 | Jackson et al. |
| 5,996,930 A | 12/1999 | Katayama et al. |
| 6,137,940 A | 10/2000 | Rageot |
| 6,409,017 B1 | 6/2002 | Bookbinder et al. |
| 6,424,783 B1 | 7/2002 | Hara |
| 6,483,320 B1 | 11/2002 | Makita et al. |
| 6,666,398 B2 | 12/2003 | Allegretto et al. |
| 6,915,058 B2 | 7/2005 | Pons |
| 7,000,863 B2 | 2/2006 | Bethea et al. |
| 7,016,024 B2 | 3/2006 | Bridge et al. |
| 7,257,280 B1 * | 8/2007 | Karpati et al. ............ 385/12 |
| 2005/0152700 A1 | 7/2005 | Fling et al. |
| 2005/0226588 A1 | 10/2005 | Pons |
| 2005/0244116 A1 | 11/2005 | Evans |
| 2006/0028915 A1 | 2/2006 | Wyar |

* cited by examiner

*Primary Examiner*—Jennifer Doan
(74) *Attorney, Agent, or Firm*—Larry T. Cullen

(57) ABSTRACT

A method and apparatus is provided for installing an optical cable link between first and second communication access points is provided. The method begins by securing a first end of an optical cable to the first communication access point to establish optical connectivity therebetween. A second end of the optical cable is secured to the second communication access point to establish optical connectivity therebetween. Prior to securing the second end of the optical cable, an optical probe signal is launched into the first or second end of the optical cable. A portion of the optical probe signal is received which has traversed at least a part of the cable and in which information concerning optical characteristics of the optical cable is embodied. An alert indicative of cable tampering is generated if the received portion of the optical probe signal changes beyond a threshold limit.

10 Claims, 4 Drawing Sheets

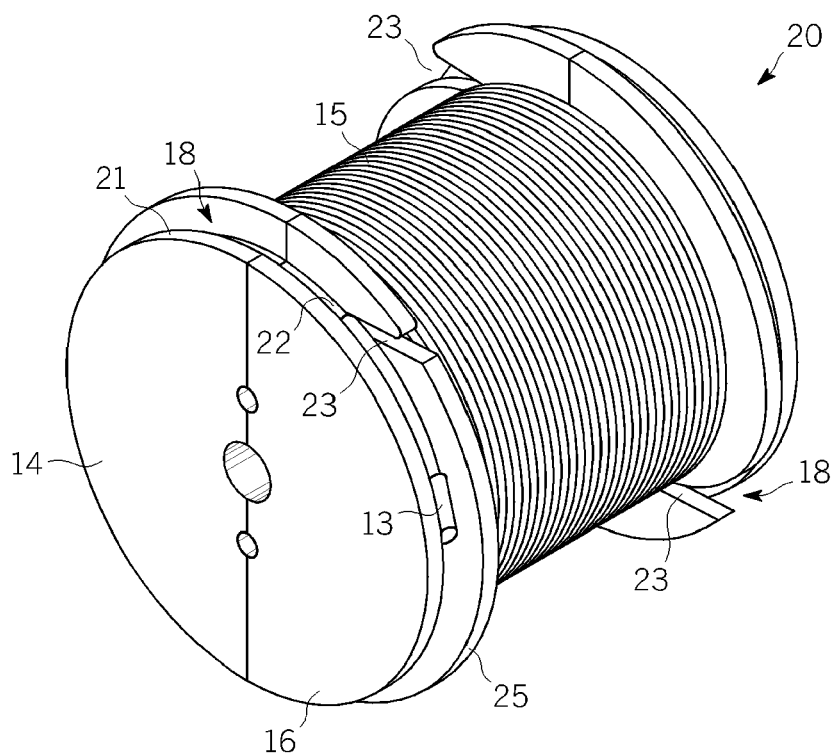
FIG. 5
-PRIOR ART-
FIG. 6
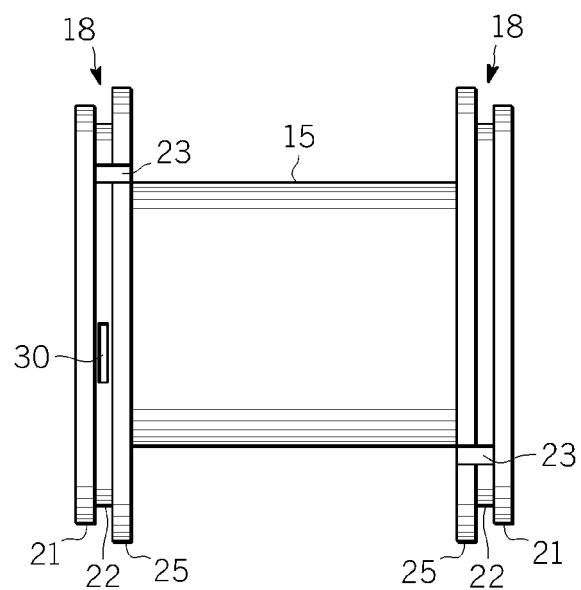

METHOD AND APPARATUS FOR MONITORING THE SECURITY OF AN OPTICAL CABLE LINK DURING INSTALLATION

This application is a Continuation of application Ser. No. 11/465,011 filed on Aug. 16, 2006, now U.S. Pat. No. 7,257,280.

FIELD OF THE INVENTION

The present invention relates generally to the installation of optical fiber cables for establishing a communication link in an optical communication system, and more particularly to a method and apparatus for monitoring the security of the optical fiber cable during installation to detect tampering therewith.

BACKGROUND OF THE INVENTION

Optical fiber has acquired an increasingly important role in the field of telecommunications, frequently replacing existing copper wires. This trend has had a significant impact in all areas of telecommunications, which has seen a vast increase in the usage of fiber. Further increases in the use of optical fiber is at least foreseen in local loop telephone and cable TV service, as local, wide area and other fiber networks are established to deliver ever greater volumes of information in the form of data, audio, and video signals to residential and commercial users. In addition, use of fiber in home and commercial business environments for internal data, voice, and video communications has begun and is expected to increase.

Optical cables are thus now used for many long-distance and local communication links, and in the nature of such links they may pass through areas where they may be accessible to those who might wish to eavesdrop on the transmitted data for the purpose of governmental or "industrial" espionage or to facilitate criminal acts of various kinds. A long optical cable link, if accessible, may not be too difficult to tap without detection; for example, if the signal level is high, a sufficient signal may sometimes be extracted by "microbending" the fiber carrying the data without the reduction in intensity at the receiving end of the fiber becoming obvious; or a more sophisticated eavesdropper might induce a cable breakdown and install a tap (possibly incorporating an optical amplifier to compensate losses) downstream of the fault before it can be repaired by the operator of the installation. Another possibility is that the cable may be tapped during deployment when a fiber link is being installed.

Certain applications require a very high degree of security to ensure that sensitive information cannot be accessed by unauthorized parties. For instance, government agencies, financial institutions and other organizations require assurances that their confidential information transmitted over a communications link will not be compromised. Such security is particularly vulnerable at the time a link is first installed. During installation, there is a possibility that the fiber could be deliberately tapped or hacked for illegal purposes. For instance, a splice could be added to the fiber as it is payed out from the fiber reel. While such illegal acts may be readily detected once a link is installed and operational, there is generally no assurance that security will not be breached during the installation period.

Accordingly, it would be desirable to provide a method and apparatus for ensuring the security of a fiber link as it is being installed.

SUMMARY OF THE INVENTION

In accordance with the present invention, a method of installing an optical cable link between first and second communication access points is provided. The method begins by securing a first end of an optical cable to the first communication access point to establish optical connectivity therebetween. A second end of the optical cable is secured to the second communication access point to establish optical connectivity therebetween. Prior to securing the second end of the optical cable, an optical probe signal is launched into the first or second end of the optical cable. A portion of the optical probe signal is received which has traversed at least a part of the cable and in which information concerning optical characteristics of the optical cable is embodied. An alert indicative of cable tampering is generated if the received portion of the optical probe signal changes beyond a threshold limit.

In accordance with one aspect of the invention, the probe signal may be launched into the first end of the optical cable and the received portion of the optical probe signal is a portion of the optical probe signal reflected back toward the first end of the optical cable.

In accordance with another aspect of the invention, the probe signal may be launched into the first end of the optical cable and the received portion of the optical probe signal is received at the second end of the optical cable.

In accordance with another aspect of the invention, a second portion of the optical probe signal may be received at the second end of the optical cable.

In accordance with another aspect of the invention, optical probe signals may be launched into both the first end and the second of the optical cable prior to securing the second end of the optical cable.

In accordance with another aspect of the invention, the optical cable may be payed out from a cable reel from the first communication access point to the second communication access point, wherein the second end of the optical cable is supported on the cable reel prior to securing it to the second communication access point and the optical probe signal is launched into the second end of the optical cable.

In accordance with another aspect of the invention, the optical probe signal may be an OTDR probe signal.

In accordance with another aspect of the invention, a location along the optical cable may be indicated at which the tampering occurred.

In accordance with another aspect of the invention, the optical probe signal may be launched and received by an OTDR system.

In accordance with another aspect of the invention, the received portion of the optical signal may be detected and the alert generated if it has a magnitude below a prescribed value.

In accordance with another aspect of the invention, an optical cable reel is provided. The optical cable reel includes a hub for supporting a helically wound optical cable. First and second rims are respectively located on the first and second end faces of the hub. A support arrangement is provided for receiving an optical monitor that is optically connectable to a proximal end of the optical cable when wound about the hub.

and an access point (e.g., a communications portal at the customer's premises) in accordance with the principles of the invention.

Figure 2:
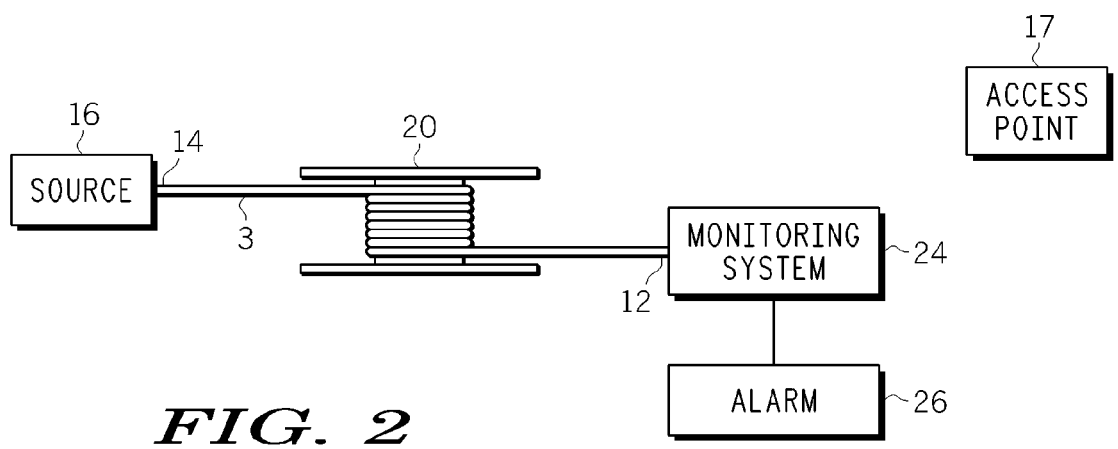

FIG. 2 shows a communication link being installed in accordance with another embodiment of the invention.

Figure 3:
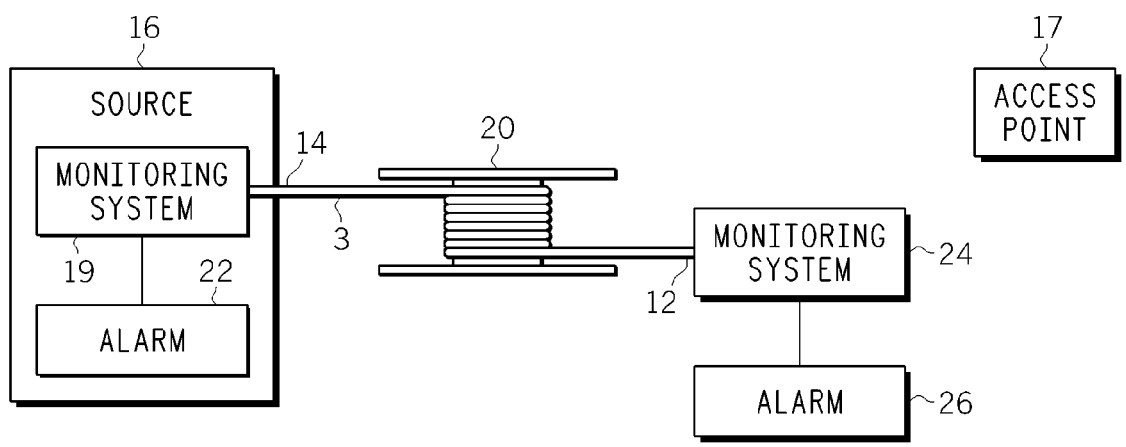

FIG. 3 shows a communication link being installed in accordance with yet another embodiment of the invention.

Figure 4:
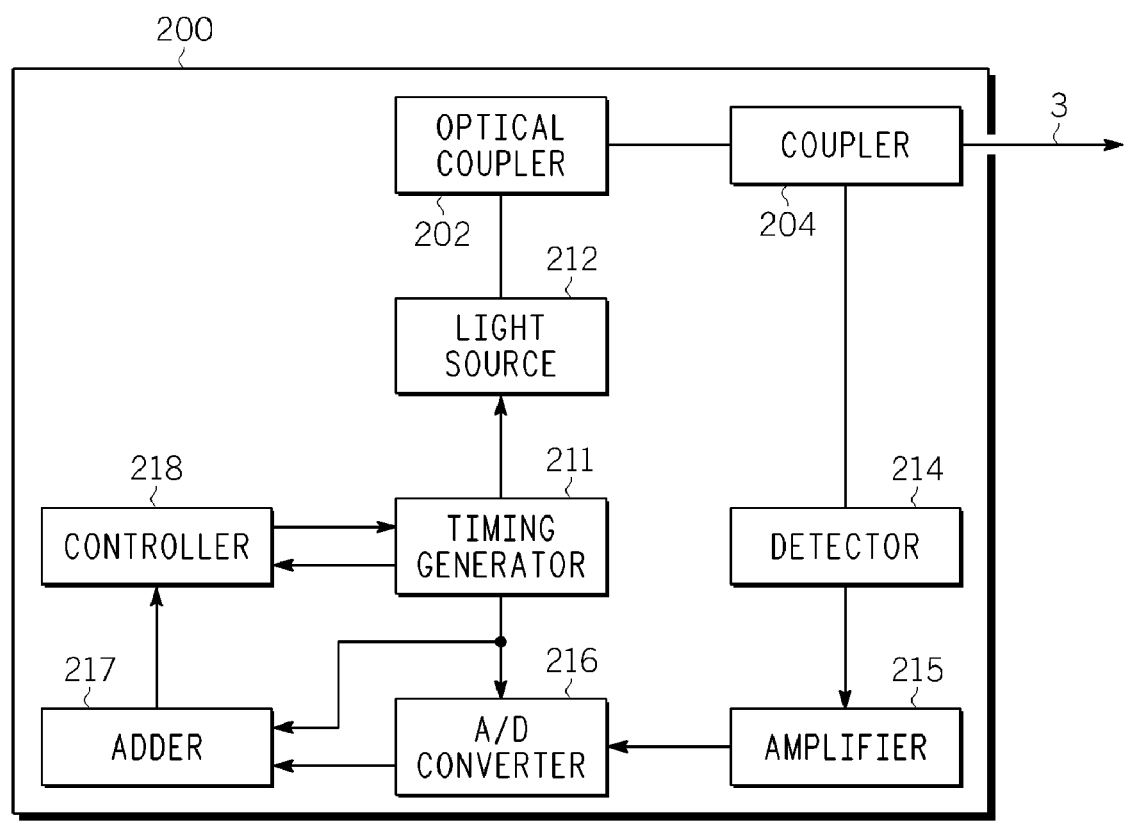

FIG. 4 is a block diagram showing one example of a conventional OTDR system that may be employed in the present invention.

FIGS. 5 and 6 shows a perspective and front elevational view, respectively, of a fiber reel constructed in accordance with the present invention.

Figure 7:
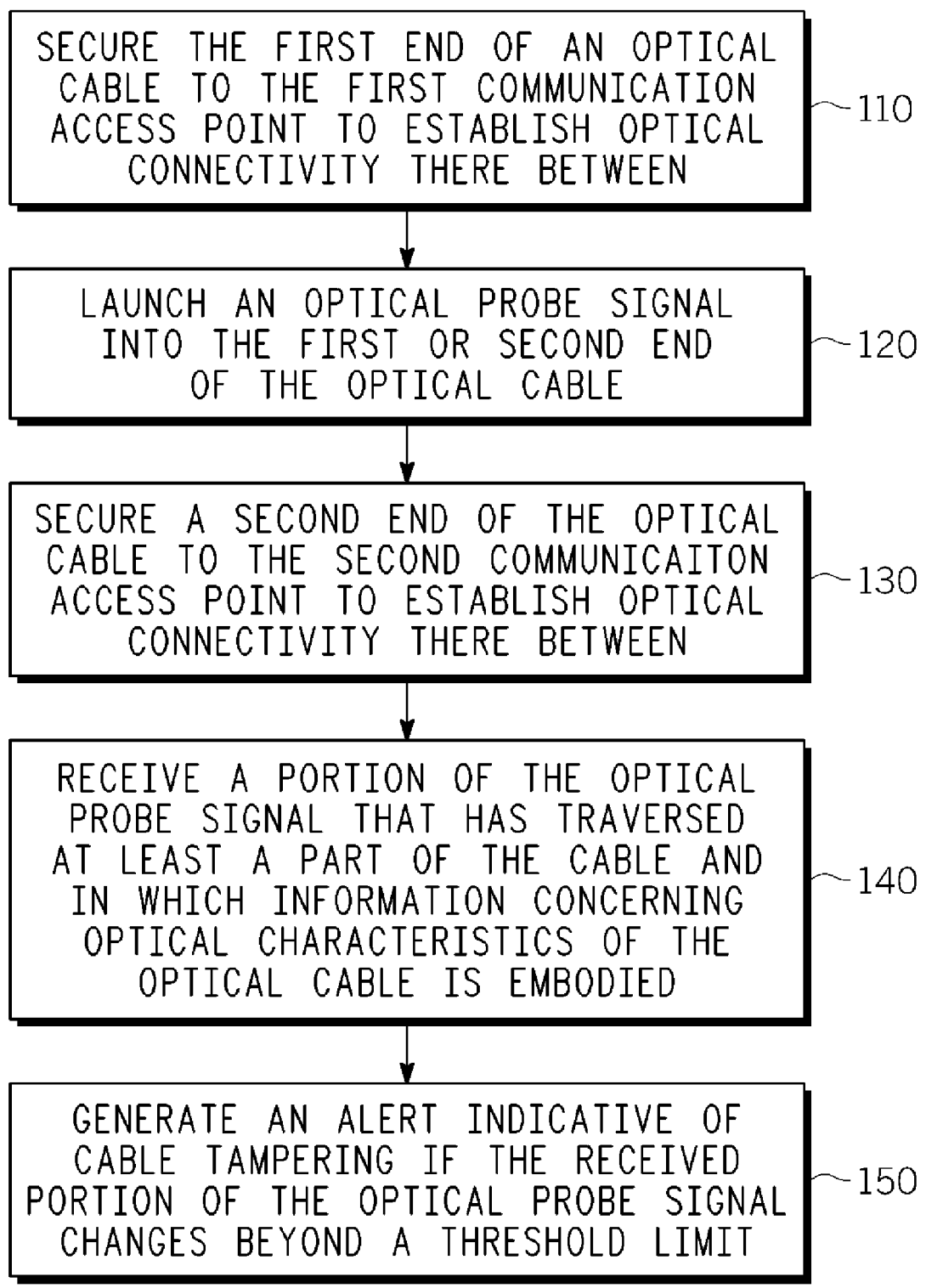

FIG. 7 is a flowchart showing one example of the method of installing an optical cable link between first and second communication access points.

DETAILED DESCRIPTION

As detailed below, during installation of an optical fiber link between a source and an access point the optical fiber is continuously monitored by a technique such as Optical Time Domain Reflectometry (OTDR) as the cable containing a fiber or fibers is payed out from a reel on which the cable is stored. In this way the installer can be immediately notified by an alarm or the like, which indicates that tampering with the cable may have occurred. In this way an investigation can be undertaken before the perpetrator can get access to the interior of the cable. In some cases an indication of the location at which tampering is suspected may also be provided.

During installation of a cable link, cable is payed out from a cable reel. The cable reel generally comprises a central drum for holding a helically wound cable and two disk shaped ends for maintaining the cable on the drum. Frequently a depression or through-hole is made in the drum for securing the starting end before winding. In order to allow the entire length of the fiber to be tested for various attributes, such as attenuation, access is typically provided to both ends of the wound fiber. It is also desirable to have access to both ends of the fiber so that fiber samples may be removed from either end for other optical and geometric measurements.

One technique that is often employed to test optical fiber for various attributes is OTDR. In OTDR, an optical probe pulse is launched into an optical fiber and backscattered and reflected signals returning to the launch end are monitored. The backscattered and reflected signals contain information concerning the optical characteristics of the cable. In the event that there are discontinuities such as faults or splices in the cable, the amount of backscattering generally changes and such change is detected in the monitored signals. By measuring the length of time it takes to receive a reflection the distance from the OTDR unit to the discontinuity can be determined. This distance is proportional to one-half the measured time interval between the launched probe pulse and the reflected response.

OTDR is conventionally used for many purposes. For instance, it is important to know how much attenuation occurs in a length of fiber before the fiber is used in a communications link. Also, it is important to determine whether excessive power loss occurs once the fiber has been placed in a communications system. Excessive power loss can be caused for various reasons, such as by excessive bending of the fiber, by mechanical damage to the fiber (for example, damage caused by excavators who inadvertently crush or break one or more strands of fiber in a cable), and by imperfections in coupling or splicing of fiber ends. Even without excessive power loss, there are other processes that cause an optical signal traversing a fiber to be attenuated. Once the fiber is used in a communications link, it is important to assess the magnitude of any attenuation through the entire length of the fiber, and also to detect where any excessive power loss is occurring so that remedial action may be taken. Also, there are often contractual terms relating to installation of optical fiber that require the power loss at any splice not to exceed a certain magnitude.

Figure 1:
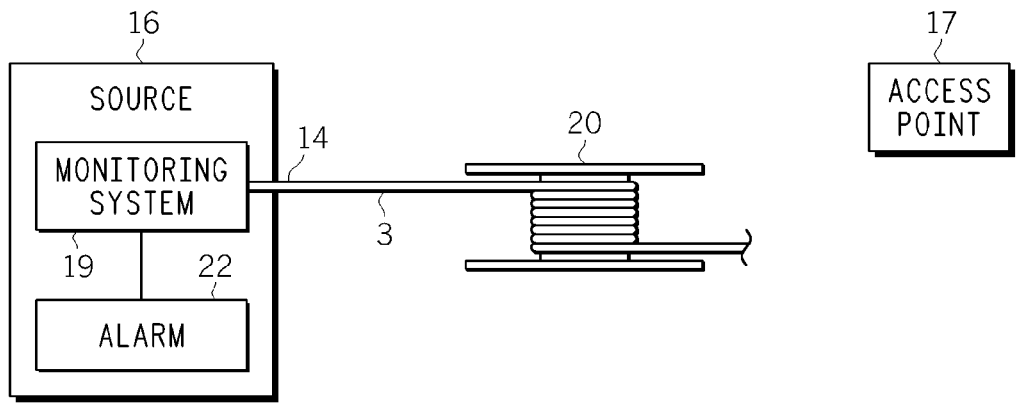
FIG. 1 shows a communication link as it is being installed between a source (e.g., a communications system headend)

FIG. 1 shows a communication link as it is being installed between a source 16 (e.g., a communications system head-end) and an access point (e.g., a communications portal at the customer's premises) 17 at which the link terminates. A distal end 14 (relative to the location of the reel 20 and the installer) of the cable 3 is first placed in optical communication with either the source 16 or the access point 17. In the example of FIG. 1, the cable is first placed in communication with the source 16. While the cable is being payed out from the reel 20 a monitoring system 19 that includes a pulsed optical signal source (for example a laser operating in pulse mode or any continuous light source pulsed by a modulator) illuminates the optical fiber or fibers in cable 3. The monitoring system 19 also includes a detector responsive to the transit time from launch of the signal to its return after being backscattered and/or reflected. The instrument functions in its usual way to observe the reflected intensity as a function of time from launch and in the event of a change not only provides an alarm indication (by activation of an alarm 22, for instance) but may also provide an estimate of the position along the length of the cable at which interference appears to have occurred, thus facilitating the apprehension of those responsible and/or repair. In some cases the monitoring system 19 is an OTDR system or other any optical time domain reflectometry arrangement. More generally, the monitoring system 19 can employ any technique that launches an optical probe pulse into the fiber and detects a return signal, regardless of whether it is responsive to the transit time from launch of the signal to its return after distributed reflection, that is, regardless of whether it employs an optical time domain reflectometry technique.

By continuously monitoring the cable 3 with the monitoring system 19 as the cable is payed out from the reel a security breach that arises from an unauthorized party tampering with the cable 3 can be identified by a change in the reflected monitoring signal. For example, if the cable 3 is tapped at some point along its length while it is being deployed, the discontinuity in the fiber caused by the tap can give rise to an additional component of the reflected monitoring signal. If the monitoring system 19 identifies such a change, it can alert (using, e.g., alarm 22) the installer that there is potential breach of security. Moreover, if the monitoring system 19 employs optical time domain reflectometry, the location of the breach along the fiber can also determined.

FIG. 2 shows another communication link being installed in which security monitoring is performed from the proximal end 12 of the cable 3 connected to the reel from which the fiber is payed out using monitoring system 24 and alarm 26. In FIGS. 1 and 2, as well as the figures that follow, like reference numerals denote like elements. In this case it may be advantageous if monitoring system 19 is a small, handheld unit such as a commercially available, handheld OTDR unit. In this way the monitoring system 19 and reel can both be carried by the installer as the cable 3 is payed out. The monitoring system 24 may be similar to any of those discussed above in connection with monitoring system 19.

FIG. 3 shows yet another communication link being installed in which security monitoring is performed from both the distal end 14 and proximal end 12 of the fiber. This arrangement provides an additional degree of security by monitoring both ends of the cable 3 as it is deployed. Each monitoring system 19 and 24 provides a return signal that can be used to identify a breach in security along the cable 3. The monitoring system 19 and 24 may or may not be of the same type. For instance, one or both monitoring systems may employ optical time domain reflectometry to identify the location of the breach along the fiber. The monitoring systems 19 and 24 may need to be synchronized with one another so that they transmit probe pulses into the fiber or fibers in cable 3 at alternating intervals of time so that they do not interfere with one another. To simplify the cost and reduce the amount of equipment that the installer must carry, the monitoring system 24 may be simply a photodetector such as a photodiode or the like. In this case the photodetector can be used to monitor the probe pulse arriving from the monitoring system 19 located at the distal end 14 of the cable 3. If the pulse is not received, or if its intensity appreciably decreases, the photodetector can alert the installer of a potential security breach along the cable.

FIG. 4 is a block diagram showing one example of a conventional OTDR system 200 being added to the Figure that may serve as monitoring system 19 and/or monitoring system 24. The OTDR system includes a timing generator 211, a light source 212, a detector 214, an amplifier 215, an A/D converter 216, an adder 217 and controller 218. An optical pulse emitted by light source 212, which is driven by a signal from the timing generator 211, is launched into the fiber located in cable 3 via an optical coupler 202. The reflected and backscattered OTDR signal is received by the detector 214 via a coupler 204, amplified with a predetermined amplification factor by the amplifier 215 and introduced to the A/D converter 216. The A/D converter 216 samples the output of the amplifier 215 in a predetermined sampling cycle, and each of the sampled data is supplied to the adder 217. The adder 217 adds together the sampled data for a predetermined time and averages the data that is supplied to the controller 218. The controller 218 analyses the averaged data to monitor the cable 3 for indications of tampering.

In some cases the portable monitoring system 24 used at the proximal end 12 of the cable 3 may be integrated with the fiber reel 20 so that they can both be more conveniently carried by the installer as the fiber is payed out from the reel. FIGS. 5 and 6 show a fiber reel 20 of the type depicted in FIG. 3 in more detail. Of course, fiber reel 20 is presented by way of illustration only and the monitoring system may be incorporated in a wide variety of different fiber reels.

Referring to both FIG. 5 and FIG. 6 it can be seen that reel 20 comprises first and second segments 14 and 16 which may be identical and which divide the reel 20 along its longitudinal axis. Each reel segment 14 and 16 comprises a semicircular drum or hub 15, only one of which is visible in FIG. 5. At each end of the semicircular hub 15 is a flange 18 comprising a first peripheral rim 25 and a second peripheral rim 21 separated by a portion of the flange having a diameter, or radius when considering only one segment, that is less than that of either rim 25 or rim 21, thereby forming a channel 22 separating rims 25 and 21. In FIG. 5 it can be seen that where a connectorized cable is to be wound on the spool, the connector or coupler 13 is wedged into the channel 22, the cable is wound on the hub, and the other end of the cable is passed through a flared groove 23 formed in the rim 25 and wedged in the channel formed between rims 25 and 21. Additional details concerning this particular fiber reel may be found in U.S. Pat. No. 4,387,863.

The reel 20 may be configured in any appropriate manner to accommodate a portable monitoring system 24. For instance, in FIG. 6 a recess 30 is provided in the channel 22. The portable monitoring system 24 may be inserted in recess 30 so that it can be supported by the reel 20. An attachment mechanism may be provided in the region of the channel 22 in the vicinity of the recess 30, or in the recess 30 itself, to secure the portable monitoring system 24 in the reel 20 in a detachable manner. By locating the portable monitoring system 24 in the channel 22 the proximal end of the cable 3 may be conveniently connected to the portable monitoring system 24 via the coupler 13 seen in FIG. 5.

FIG. 7 is a flowchart showing one example of a method of installing an optical cable link between first and second communication access points. The method begins in step 110 by securing a first end of the optical cable to the first communication access point to establish optical connectivity therebetween. In step 120 an optical probe signal is launched into either the first or second end of the optical cable. After the probe signal is launched, in step 130 the second end of the optical cable is secured to the second communication access point to establish optical connectivity therebetween. A portion of the optical probe signal that has traversed at least a part of the cable and in which information concerning optical characteristics of the optical cable is embodied is received in step 140. An alert indicative of cable tampering is generated in step 150 if the received portion of the optical probe signal changes beyond a threshold limit.

A method and apparatus has been described for detecting a security breach that may arise when an optical cable link is being installed. The method uses an optical monitoring technique (e.g., OTDR) to determine if the optical cable link is being tapped as it is being installed.

The invention claimed is:

1. An optical cable reel, comprising:
   a hub for supporting a helically wound optical cable;
   first and second rims respectively located on first and second end faces of the hub;
   a support arrangement for receiving an optical monitor that is optically connectable to a proximal end of the optical cable when wound about the hub; and
   the optical monitor including:
   a source configured to launch a first optical probe signal into a first or second end of an optical cable prior to securing another end of the optical cable to a communication access point;
   a receiver configured to receive the first optical probe signal that has traversed at least a part of the optical cable and in which information concerning optical characteristics of the optical cable is embodied; and
   a controller configured to analyze the received portion of the optical probe signals for an indication of tampering,
   wherein subsequent optical probe signals are launched and received until the first optical cable end is secured to the first communication access point to establish optical connectivity therebetween and the second optical cable end is secured to a second communication access point to establish optical connectivity therebetween.

2. The optical cable reel of claim 1 wherein the optical monitor is an OTDR system.

3. The optical cable reel of claim 1 wherein the optical monitor is a photodetector.

4. The optical cable reel of claim 1 wherein the support arrangement is configured to detachably receive the optical monitor.

5. The optical cable reel of claim 1, wherein an alert indicative of cable tampering is provided the received portion of the optical probe signal changes beyond a threshold limit.

6. An apparatus for monitoring an optical cable comprising:
   a source configured to launch a first optical probe signal into a first or second end of an optical cable prior to securing another end of the optical cable to a communication access point;
   a receiver configured to receive the first optical probe signal that has traversed at least a part of the optical cable and in which information concerning optical characteristics of the optical cable is embodied; and
   a controller configured to analyze the received portion of the optical probe signals for an indication of tampering, wherein subsequent optical probe signals are launched and received until the first optical cable end is secured to the first communication access point to establish optical connectivity therebetween and the second optical cable end is secured to a second communication access point to establish optical connectivity therebetween.

7. The apparatus of claim 6, wherein the optical monitor is an OTDR system.

8. The apparatus of claim 6, wherein the optical monitor is a photodetector.

9. The apparatus of claim 6, wherein the support arrangement is configured to detachably receive the optical monitor.

10. The apparatus of claim 6, wherein an alert indicative of cable tampering is provided the received portion of the optical probe signal changes beyond a threshold limit.

* * * * *